United States Patent
Wang et al.

(10) Patent No.: US 10,423,907 B2
(45) Date of Patent: Sep. 24, 2019

(54) GEOLOCATION BASED WORK DATA ON A MOBILE DEVICE USING A DATABASE SYSTEM

(71) Applicant: salesforce.com, inc., San Francisco, CA (US)

(72) Inventors: Lei Wang, San Carlos, CA (US); Billy Ma, Berkeley, CA (US); Rajan Patel, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 961 days.

(21) Appl. No.: 14/516,941

(22) Filed: Oct. 17, 2014

(65) Prior Publication Data
US 2015/0112745 A1    Apr. 23, 2015

Related U.S. Application Data

(60) Provisional application No. 61/892,784, filed on Oct. 18, 2013.

(51) Int. Cl.
*G06Q 10/06* (2012.01)
*G06F 16/29* (2019.01)

(52) U.S. Cl.
CPC ..... *G06Q 10/063114* (2013.01); *G06F 16/29* (2019.01)

(58) Field of Classification Search
CPC ....................................................... G06Q 10/06
USPC ............................................................ 705/7.15
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Nga B Nguyen
(74) *Attorney, Agent, or Firm* — Weaver Austin Villeneuve & Sampson LLP

(57) ABSTRACT

Disclosed are examples of systems, apparatus, methods and computer program products for displaying work items according to detected user locations, schedules, and other information. For example, a user's location may be detected by a user device, and work items may be selected for display on the user device. The user may be affiliated with a business organization and the work items may identify business records of the business organization that have associated addresses nearby the user's location and that may be accommodated by the user's schedule. Certain priorities can govern which work items are provided. The work items may be organized as cards of an information deck. The user may interact with and share the cards.

21 Claims, 8 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B2 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,792 B2 | 10/2013 | Chasman et al. |
| 8,646,103 B2 | 2/2014 | Jakobson et al. |
| 10,062,042 B1* | 8/2018 | Kelly ............ G06Q 10/063116 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |

(56) References Cited

U.S. PATENT DOCUMENTS

| | | |
|---|---|---|
| 2005/0055262 A1* | 3/2005 | Florczak ............... G06Q 10/06 705/7.15 |
| 2005/0091098 A1 | 4/2005 | Brodersen et al. |
| 2005/0209902 A1* | 9/2005 | Iwasaki .......... G06Q 10/063112 705/7.26 |
| 2008/0249972 A1 | 10/2008 | Dillon |
| 2009/0049057 A1* | 2/2009 | Ghani .................. G06Q 20/204 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0287025 A1* | 11/2010 | Fletcher ................ G06Q 10/06 705/7.15 |
| 2010/0312605 A1* | 12/2010 | Mitchell ............... G06Q 10/06 705/7.13 |
| 2011/0112943 A1* | 5/2011 | Dietz .................... G06Q 10/06 705/32 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0078387 A1* | 3/2012 | Kashyap ............ G05B 23/0272 700/17 |
| 2012/0089493 A1* | 4/2012 | Podgurny ............. G06Q 10/06 705/32 |
| 2012/0233137 A1 | 9/2012 | Jakobson et al. |
| 2012/0259540 A1* | 10/2012 | Kishore ................ G06Q 10/06 701/410 |
| 2012/0290407 A1 | 11/2012 | Hubbard et al. |
| 2013/0167122 A1 | 6/2013 | Chasman et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0262475 A1* | 10/2013 | Barak .............. G06Q 10/06311 707/748 |
| 2014/0096234 A1* | 4/2014 | Zafiroglu ........... H04L 63/0823 726/17 |
| 2014/0108078 A1* | 4/2014 | Davis ............. G06Q 10/063112 705/7.14 |
| 2014/0278644 A1* | 9/2014 | Ferreira ......... G06Q 10/063114 705/7.15 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

GEOLOCATION BASED WORK DATA ON A MOBILE DEVICE USING A DATABASE SYSTEM

PRIORITY DATA

This patent document claims priority to and commonly assigned U.S. Provisional Patent Application No. 61/892,784, titled "System and Method for a Travel Planner", by Wang et al., filed on Oct. 18, 2013, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to task scheduling on an electronic device. More specifically, this patent document discloses techniques for suggesting tasks and/or activities to a user on a computing device based on the user's geographic location.

BACKGROUND

Databases may store information in Customer Relationship Management (CRM) records such as contacts. Contacts stored in a database may include information such as an address associated with the contact, a phone number, and an e-mail address. Information in the database may be accessed by electronic computing devices via WiFi, 4G data connections, and other wireless communications techniques.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1A:
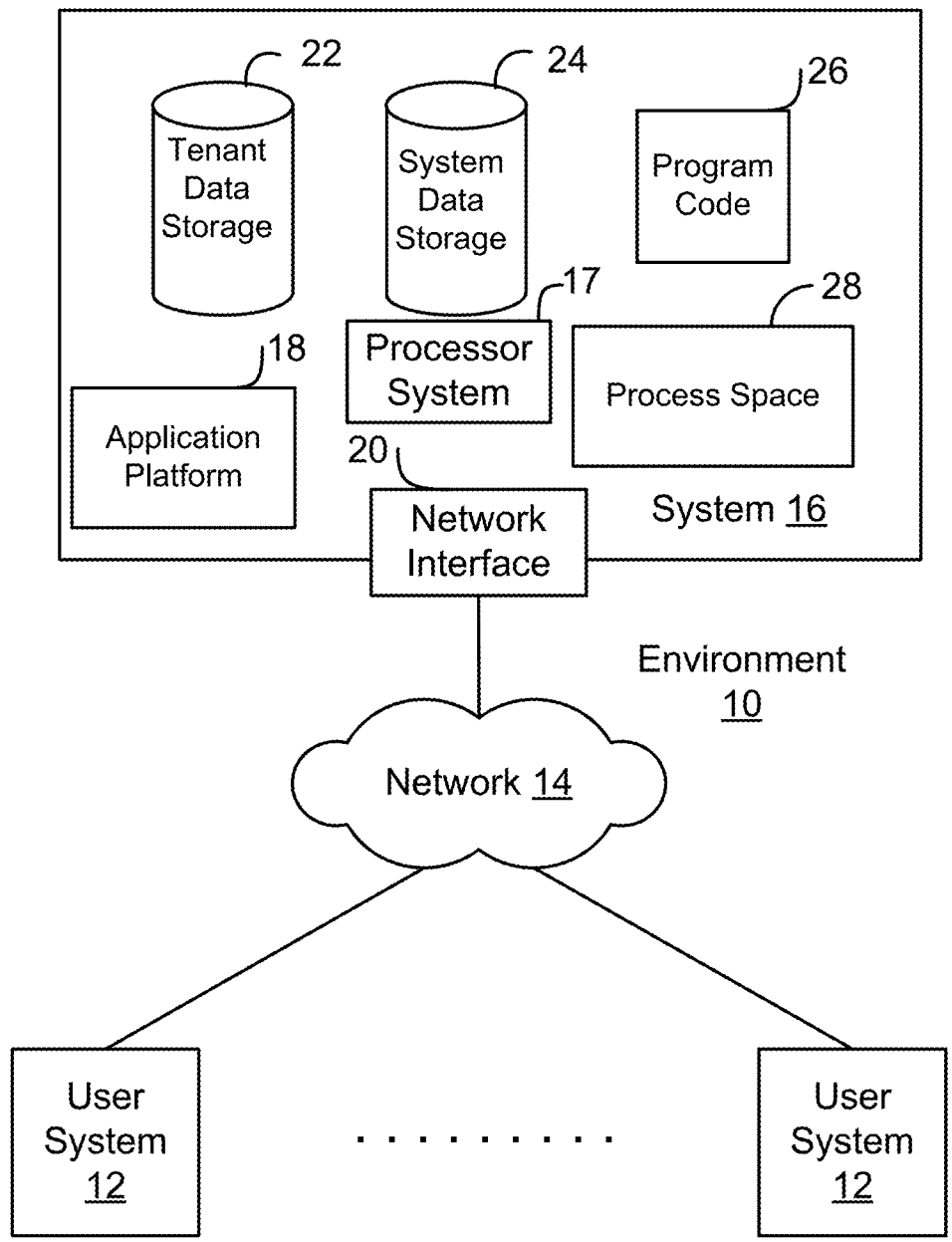
FIG. 1A shows a block diagram of an example of an environment 10 in which an on-demand database service can be used in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to provide a user of a computing device such as a smartphone, tablet, or desktop computer with items the user can work on. For example, the user can be an employee or agent of a business organization that utilizes a Customer Relations Management (CRM) database. Task suggestions and reminders are examples of work items that may be based on data stored in the CRM database. As used herein, task suggestion generally refers to any task that may be suggested to a user. Reminders may be any data presented to the user to remind the user of tasks, events, or other information. For example, potential sales opportunities and leads may be suggested to the user as tasks to work on and displayed on the user's computing device. Reminders regarding scheduled meetings, scheduled tasks, and quotas may also be displayed to the user. Contacts and/or account information may also be displayed to the user.

In some implementations, the computing device may be a mobile electronic device such as a cellphone, smartphone, PDA, tablet, smartwatch, laptop computer, or other portable electronic device. In other implementations, the computing device may be a generally stationary electronic device such as a server, desktop computer, or other device designed to remain in a fixed location during operation. It should be appreciated that, in various implementations, some of the techniques described herein may be implemented with mobile devices as well as stationary devices and that parts of the disclosure described as being performed by a mobile device may also or alternatively be performed by a stationary device, and vice versa. In certain implementations, both mobile devices and stationary devices may be used concurrently or complementarily in carrying out some of the techniques described herein.

In some implementations, task suggestions and reminders are provided to the user's computing device based on the user's geolocation, schedule, and other information. Such information may be stored in or identified by a mobile device carried by the user and/or may be identified by a server. The geolocation and other information may be analyzed to determine which work items should be provided to the user device for display to the user. Additionally, the analysis may involve determining an order of the task suggestions and reminders when presented to the user on a display. In some implementations, priorities can govern which work items are sent to the user device for display to the user. The work items may be displayed on the user device in the form of cards of an information deck, explained in greater detail below. The user may interact with and share the cards.

In one example, Pat is a user from Los Angeles. Today he is visiting San Francisco and has a meeting at 1:30 pm. It is currently 12:00 pm, and his calendar shows that he is free until the 1:30 pm meeting. Pat carries a mobile device such as a smartphone or tablet, which detects, from Global Positioning System (GPS) signals, that he is currently located in the Mission District of San Francisco. In some other implementations, the mobile device may detect Pat's location in other ways, such as through signals from cell phone towers or through analyzing data from accelerometers to determine the distance that he has moved from a previous location. The mobile device then communicates Pat's location to a server via a data communications protocol such as 4G or WiFi. In some other implementations, the mobile device processes the data without communicating it to a server.

After Pat's location is determined, a server or Pat's mobile device analyzes Pat's location and schedule to determine which work items, such as task suggestions, to display to Pat. For example, it may be determined that there are four potential accounts within one mile of Pat's location. It can be estimated that it may take about an hour to service each account; thus, Pat may be able to service one account between the current time and his meeting at 1:30 pm, taking into account that total travel time to and from each contact would be about 20 minutes. Details for each of the four potential accounts may be retrieved from a CRM database and communicated to Pat's mobile device. It may also be determined that two additional accounts have addresses within one mile of Pat, but since each of those accounts would require an estimated two hours to service, Pat does not have the ability to service the two accounts before his meeting at 1:30 pm. Thus, the software may not serve the details for the two additional accounts to Pat's mobile device.

In some implementations, the users described herein are members of an interactive online enterprise platform. The enterprise platform may provide various CRM services and other database management services, any data of which may be accessed and used in conjunction with the techniques disclosed herein. The enterprise platform may also include a CRM database.

The various services and techniques described herein may be provided in a cloud computing environment such as, for example, in the context of a multitenant database system. In addition, the mobile devices carried by the users may also be a part of the enterprise platform, or at least linked to the enterprise platform or the CRM database through wireless communication channels as described above. In some implementations, the CRM database may be structured to store and identify CRM records, for example, in a hierarchical database model with certain records having child-parent or parent-child relationships with other records at different layers or positions in the hierarchy. Other implementations of the various services and techniques described herein may utilize an unstructured database model or system. Some of the described techniques and processes may be implemented without locally installed software, whether on the mobile device or any other user device, though other implementations may include locally installed software. While the disclosed implementations may be described with reference to cloud-based multitenant CRM systems, it is appreciated that the disclosed techniques and processes may be implemented in the context of various other database systems such as non-cloud-based systems or cloud-based systems that are not part of a multitenant database system.

The enterprise platform may share certain information between or among users. For example, accounts and other types of CRM records may be shared among all salespeople operating on behalf of the organization. Thus, in the example above, selected accounts may be suggested to any salesperson from the organization at Pat's location who has more than an hour's downtime. In other implementations, data may be personalized to each individual salesperson, and in those implementations, other salespeople may not be served the accounts identified to Pat, no matter their location or schedule.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multitenant database system (MTS). The term "multitenant database system" can refer to those systems in which various elements of hardware and software of a database system may be shared by one or more customers or tenants. For example, a given application server may simultaneously process requests for a great number of customers, and a given database table may store rows of data such as work items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium®, Core®, or Xeon® processor or the like. Similarly, the system 16 (and additional instances of an MTS, where more than one is present) and all of its components can be operator-configurable using application (s) including computer code to run using the processor system 17, which may be implemented to include a CPU or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
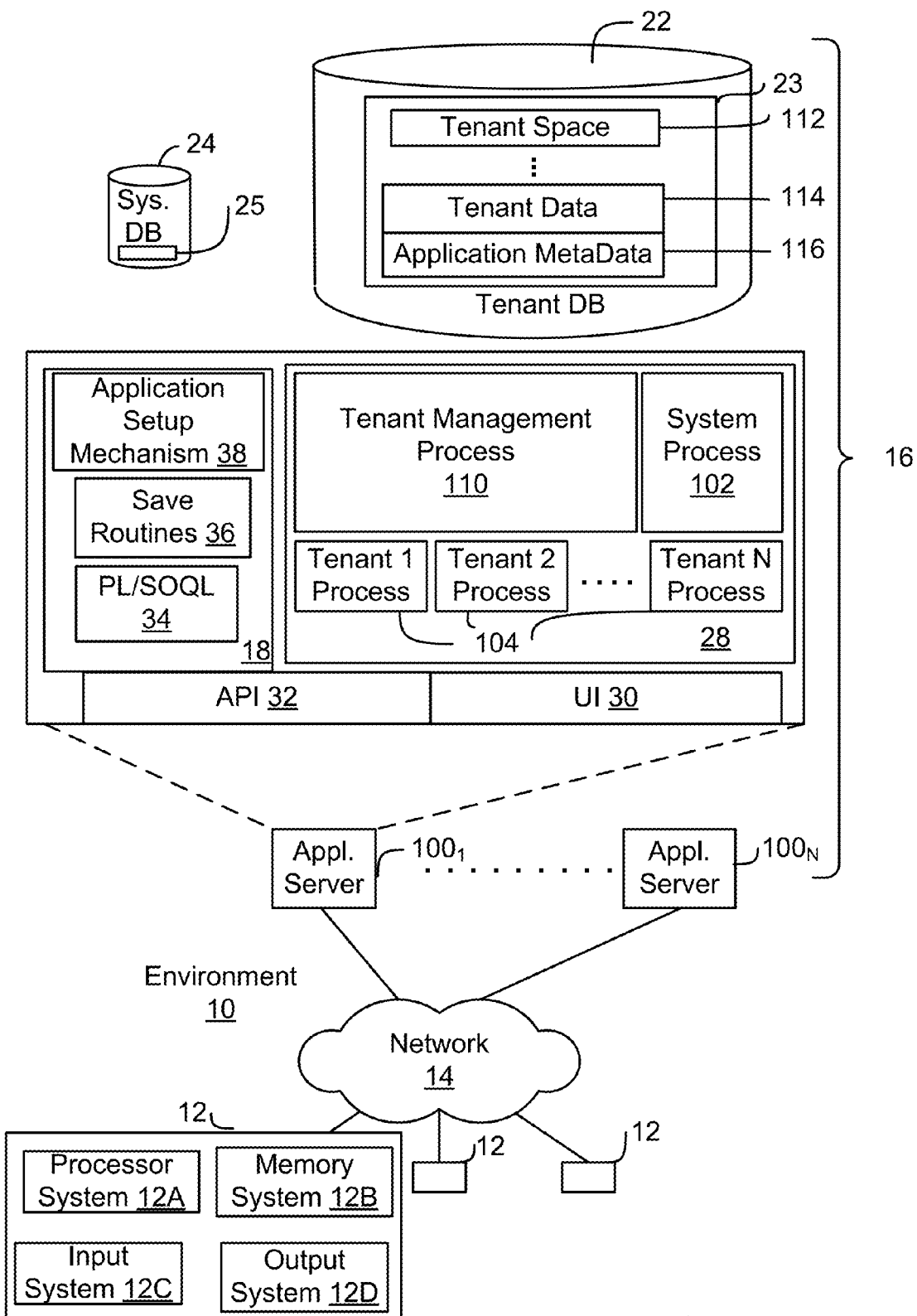
FIG. 1B shows a block diagram of an example of some implementations of elements of FIG. 1A and various possible interconnections between these elements.

FIG. 1B shows a block diagram of an example of some implementations of elements of FIG. 1A and various possible interconnections between these elements. That is, FIG. 1B also illustrates environment 10, but in FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multitenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multitenant database system. In some implementations, for example, all custom entity data rows are stored in a single multitenant physical table, which may contain multiple logical tables per organization. It is transparent to customers that their multiple "tables" are in fact stored in one large table or that their data may be stored in the same table as the data of other customers.

Figure 2A:
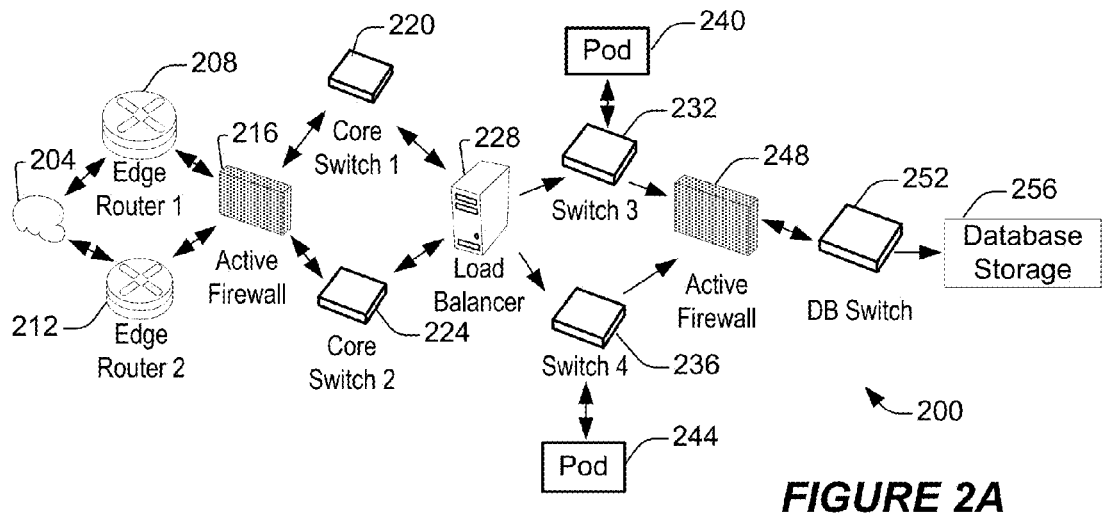
FIG. 2A shows a system diagram of an example of architectural components of an on-demand database service environment 200, in accordance with some implementations.

FIG. 2A shows a system diagram of an example of architectural components of an on-demand database service environment 200, in accordance with some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
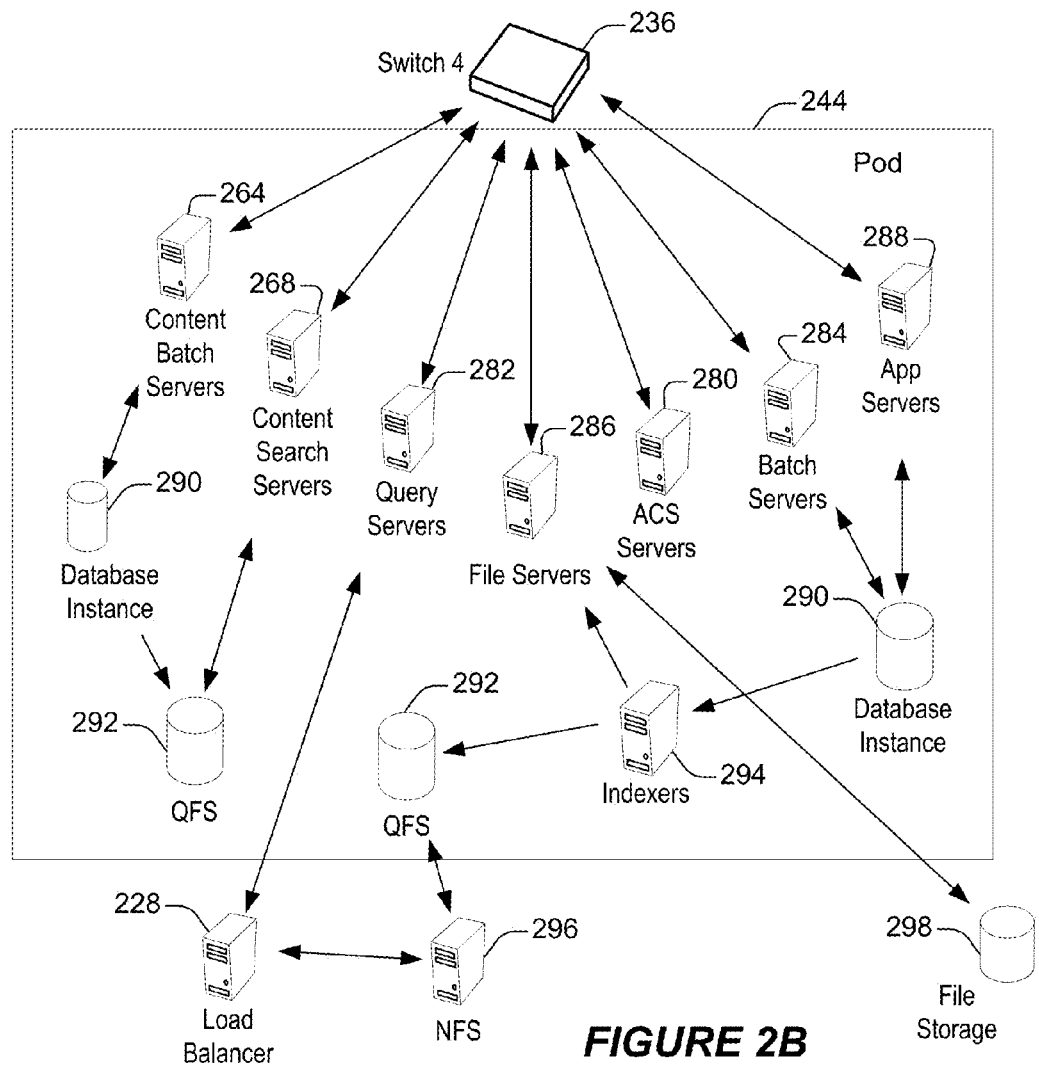
FIG. 2B shows a system diagram further illustrating an example of architectural components of an on-demand database service environment, in accordance with some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multitenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating an example of architectural components of an on-demand database service environment, in accordance with some implementations. The pod 244 can be used to render services to a user of the on-demand database service environment 200. In some implementations, each pod includes a variety of servers or other systems. The pod 244 includes one or more content batch servers 264, content search servers 268, query servers 282, file servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multitenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file servers 286 or the QFS 292.

Some of the disclosed methods, processes, devices, systems and computer-readable storage media described herein can be configured or designed for use in a multitenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports and forecasts, among other possibilities. For example, a record can be for a business partner or potential business partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records. In other implementations, for instance, when the record is stored and maintained in an unstructured database or data system, there may be no parent-child nor child-parent relationships between or among records and thus no hierarchical structure to the database.

In some implementations, data is stored in database system 16, including tenant database 22, in the form of "entity objects" (also referred to herein simply as "entities"). In some implementations, entities are categorized into "Records objects" and "Collaboration objects." Each record can be considered a sub-object of the overarching Records object. In some implementations, Collaboration objects include, for example, a "Users object," a "Groups object," a "Group-User relationship object," and a "Record-User relationship object".

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multitenant enterprise platform, the Users Table can include all of the users within all of the organizations that are tenants of the multitenant platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multitenant platform, the Groups Table can include all of the groups within all of the organizations that are tenants of the multitenant platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multitenant platform, the Group-User Table can include all of the groups within all of the organizations that are tenants of the multitenant platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multitenant platform, the Records Table can include all of the records within all of the organizations that are tenants of the multitenant platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multitenant platform, the Record-User Table can include all of the records within all of the organizations that are tenants of the multitenant platform.

Figure 3:
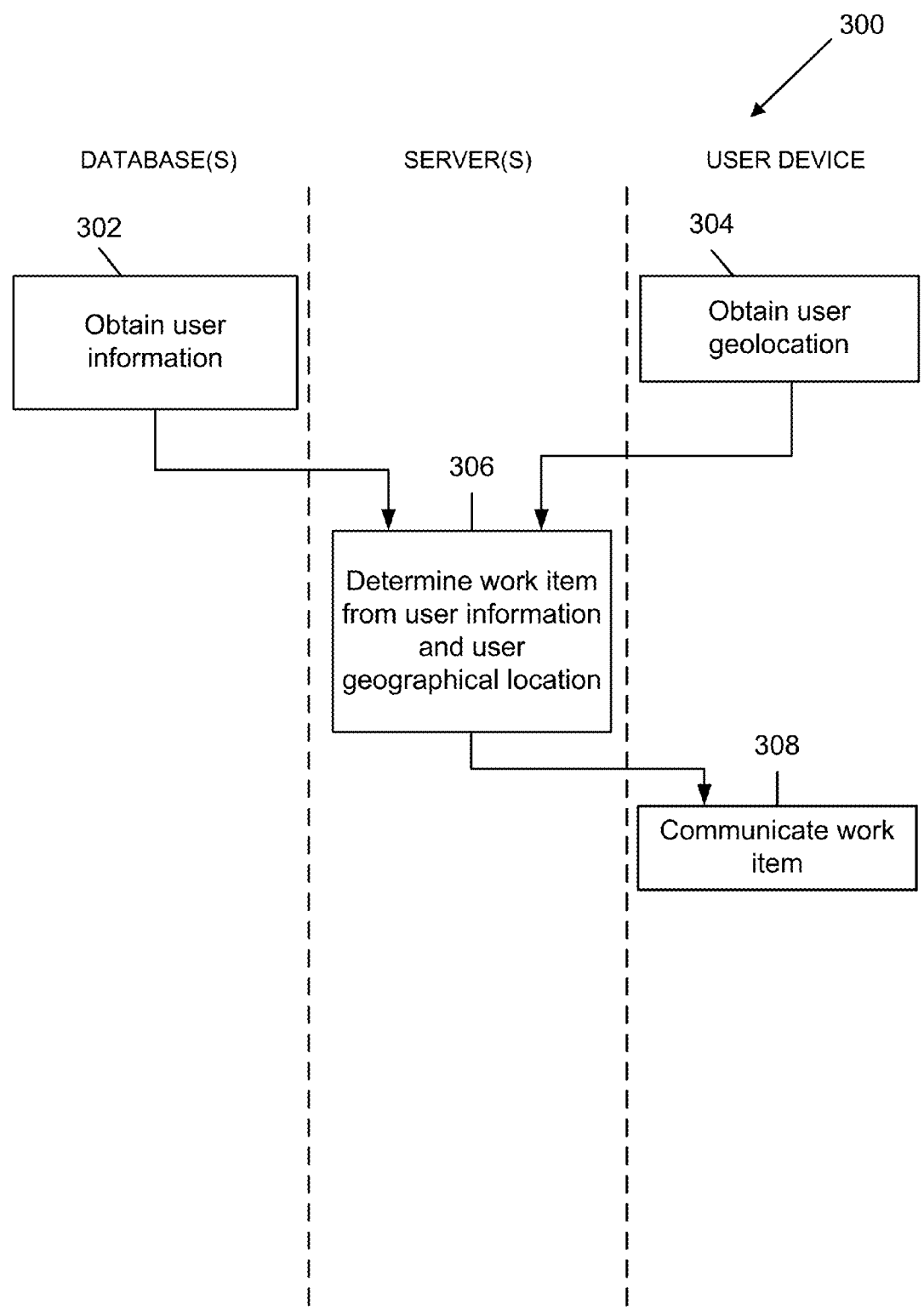
FIG. 3 shows an example of a diagram of operations performed amongst a user device, one or more servers, and a database for providing work items based on geolocation, performed in accordance with some implementations.

FIG. 3 shows an example of a diagram of operations performed amongst a user device, one or more servers, and a database for providing work items based on geolocation, performed in accordance with some implementations.

In FIG. 3, user geolocation is obtained in block 304. The user geolocation may be obtained by, for example, a location sensor, a manually selected location such as a location entered by the user on his or her computing device, or a location detected via a user check-in. The location sensor may be, for example, a GPS tracker or other location sensor located on a user device. The user device may be any user system as described herein, such as a mobile device, a tablet, a stationary device, or a smartwatch. One or more servers may then receive the user geolocation from the user device.

In block 302, user information is obtained from records stored in one or more databases. The user information may be user schedule data, user performance data, goals and progress data, contact data, leads data, customer follow-up data, communications data such as e-mails and other communications history, as well as any other data applicable to the performance of the user's role. The type of records accessed in block 302 may vary depending on the user's role. For example, if the user is a salesperson, the record data may include contact data and leads data. The record may be a standard record available from a CRM-affiliated service or a custom record offered according to the individual needs of an organization. For example, a service may provide accounts and opportunities as standard records, but may also offer the ability for an organization to create custom records. Accordingly, an organization that is connected with the insurance industry may create a custom record called "underwriting" to designate records that are associated with the underwriting process.

In block 306, after the user information and geolocation are obtained, a work item is determined from the user information and geolocation. The work item may include work data, for example, a user task suggestion, a user task reminder, user performance data, goals data, progress data, contact data, leads data, customer follow-up data, a user schedule, navigation data, and any other data useful to performance of the user's role. The work item may be determined by one or more processors within an electronic device of the system 16 described in FIGS. 1A and 1B, within a user device such as a smartphone or tablet, or within another device.

At 306, multiple work items may be determined. The order that multiple work items are displayed to the user can also be determined. Displayed work items may be constantly updated according to the user geolocation and information from the CRM database, as well as time data and user information from other sources. Accordingly, a work item may be determined to be relevant to a user at a first time, but at a second time, may be determined to not be relevant to the user. A non-limiting example may be where a user has a two-hour gap until his next meeting at a first time, in which case a work item that includes a task with an estimated completion time of one hour may be relevant to output to the user. At a second time that is a half-hour before the his next meeting, the work item may no longer be relevant. In certain implementations, when work items are determined to no longer be relevant, the work items may no longer be displayed. The continuous updating of the relevancy and display of work items is to be contrasted with traditional social networking feeds, which maintain and output a chronology of feed items without relevancy determinations.

After the work item is determined in block 306, it is communicated from the server(s) to the user device in block 308. In certain implementations, the work item may be communicated to the user via a display on the user device. In some implementations, the work items are displayed in the form of cards or blocks of information. Each card may contain work data relevant to the work item. For example, a sales opportunity card may contain information not only identifying the opportunity itself, but also identifying the business name, the main contact information, the business address, the business phone number, the main contact phone number, the type of opportunity, information on the relationship of the opportunity or contact with the company and/or the salesman and the contact, the type of business, a rating for the importance of the opportunity, a rating for the likelihood of closing the opportunity, business hours, and other relevant information. Such information can be retrieved from related records in a CRM database, from other databases and/or from publicly accessible sites on the Internet. A sequence or other arrangement of multiple cards may form an information deck displayed on the user device. The information deck may include the work items and other information such as the date, day of the week, the weather, a map of the surrounding area, and other information that may aid the user or be of interest to the user.

As an illustrative example, Hao is a salesman traveling in Kansas City. His smartphone detects that he is located in Kansas City and transmits his location to a server, which then obtains information associated with Hao from one or more databases. Hao is identified as a salesman for Acme, Inc., and it is determined that there are two sales opportunities within two miles of Hao's location. The server determines that the two sales opportunities are relevant outputs for Hao, i.e., that the two sales opportunities may be helpful to Hao in the performance of his role as a salesman. In some implementations, information may be deemed relevant if the information meets certain criteria and/or priorities set by the user or administrator. Whether information is determined to be relevant is described in greater detail in Figure HH.

After determining that the two sales opportunities are relevant work items for Hao, the work items are communicated to Hao's smartphone. Hao's smartphone may then display the work items in the form of a card or cards within an information deck.

Figure 4:
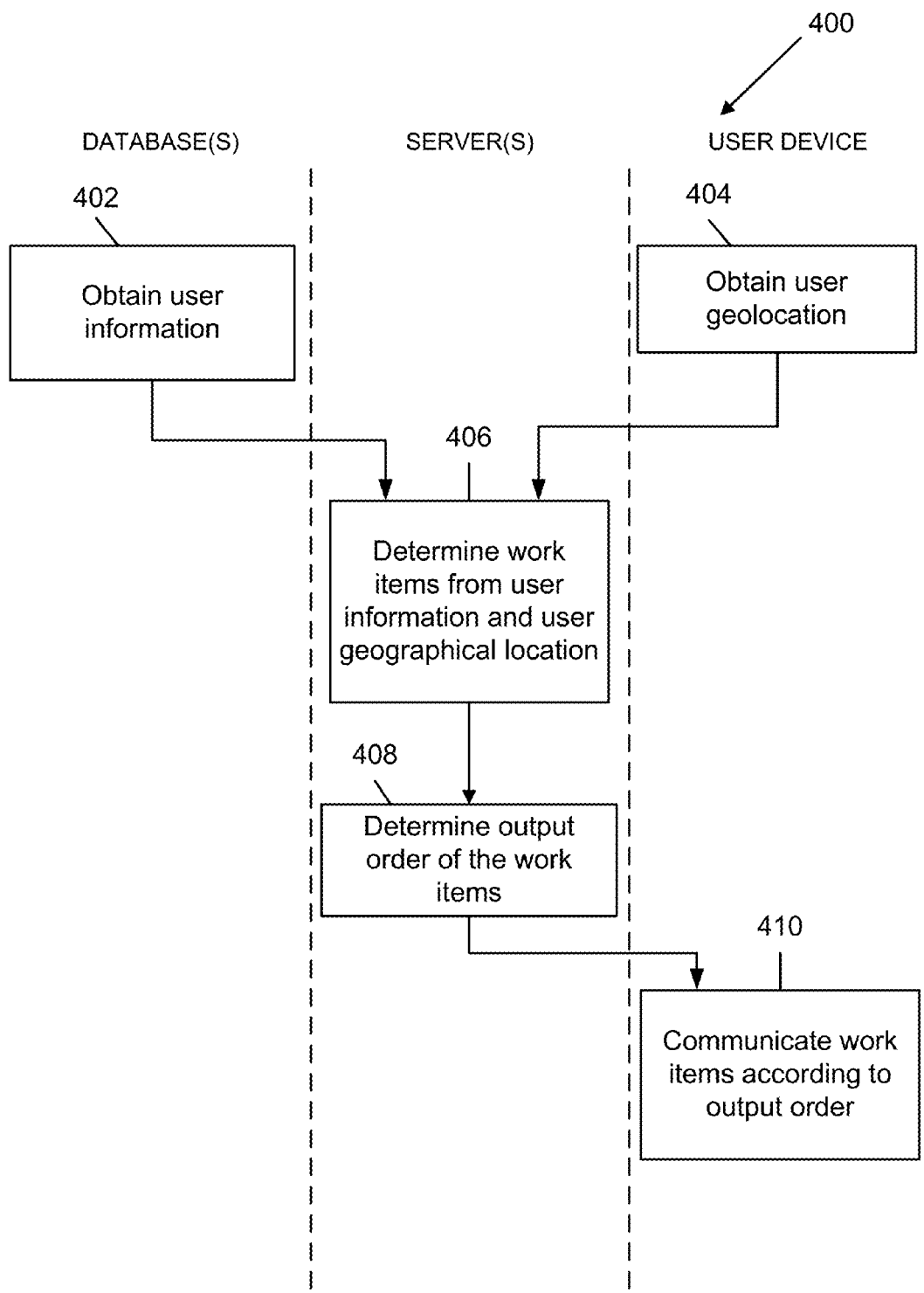
FIG. 4 shows an example of a diagram of operations performed amongst a user device, one or more servers, and a database for providing work items in a certain order based on geolocation, performed in accordance with some implementations.

FIG. 4 shows an example of a diagram of operations performed amongst a user device, one or more servers, and a database for providing work items in a certain order based on geolocation, performed in accordance with some implementations. FIG. 4 is similar to FIG. 3, but FIG. 4 is specific to multiple work items. Blocks 402, 404, and 406 in FIG. 4 are similar to blocks 302, 304, and 306 in FIG. 3 as described above.

In block 408, an output order of the work items is determined by one or more servers. In other implementations, the output order of the work items may be determined by the user device. In contrast with a traditional social networking feed, which outputs feed items in chronological order, an output order for work items can be determined to maximize the visibility of more important work items. The output order may be determined by considering one, some, or many possible factors. For example, organization-determined priority, distance to the user, travel time, importance of the contact, possibility of closing, a dollar value of an account, size of a possible account, relationship of the contact to the salesperson or the company, days remaining in current quota period, etc. may all be possible factors. In block 410, the work items are communicated from the server(s) to the user device with information identifying the output order determined in block 408.

In one example, Tim is a relationship manager who is currently traveling in Seattle. He has two hours before his next scheduled client meeting. His tablet detects that he is checking his e-mail in Seattle. The tablet then downloads information associated with Tim from a CRM database. The CRM database of Tim's company is configured such that each user has access to company account information of all users. Thus, though Tim is a relationship manager, his tablet can also access CRM database information relating to potential sales contacts.

The tablet determines that within 1 mile of Tim's location is Lily's Bakery, a bakery that is a current customer of Tim's company, and Vidal's Bakery, a bakery that is a potential account. Also, between 1 mile and 2 miles of Tim's location is Big Sam's BBQ Restaurant, Shack of Burgers, and The Bread Van, all of them current customers of Tim's company. The information from the CRM database includes estimates that servicing the relationship with Lily's Bakery would require an hour, pursuing the account of Vidal's Bakery would also require an hour, and that servicing the relationships with Big Sam's BBQ Restaurant, Shack of Burgers, and The Bread Van, would require half an hour, an hour, and three hours, respectively. All the estimated times above include estimated travel time.

Tim's tablet is set up to determine an output order for the various work items. In this example, determination of the output order takes into consideration the following factors: user's schedule, the distance of the contact to the user, and the role of the user within the company. The factors are prioritized such that the likelihood of fitting within the user's schedule is the highest priority in determining the order of the work items, the role of the user is the second highest priority, and the distance of the contact to the user is the third highest priority.

Accordingly, it is then determined, taking into consideration that Tim has two hours until his next scheduled meeting, he will likely be able to meet with Lily's Bakery, Vidal's Bakery, Big Sam's BBQ Restaurant, and Shack of Burgers. Since meeting with The Bread Van would have a high likelihood of making Tim late to his next meeting, the record for The Bread Van is determined to be a work item that would not be helpful to Tim. Thus, analyzing the potential meetings, it is determined that the record associated with The Bread Van should not be outputted, but the records associated with Lily's Bakery, Vidal's Bakery, Big Sam's BBQ Restaurant, and Shack of Burgers may be outputted.

Analyzing the records according to the second most important factor, the role of the user, it is determined that since Vidal's Bakery is a potential account and since Tim is a relationship manager in charge of existing relationships rather than a salesman responsible for obtaining new accounts, the record associated with Vidal's Bakery is a lower priority compared to the records associated with Lily's Bakery, Big Sam's BBQ Restaurant, and Shack of Burgers. Thus, the work item for Vidal's Bakery has a lower priority than the work items for Lily's Bakery, Big Sam's BBQ Restaurant, and Shack of Burgers. Accordingly, the work item for Vidal's Bakery is determined to be outputted after that of the outputs for Lily's Bakery, Big Sam's BBQ Restaurant, and Shack of Burgers. In certain other implementations, since the task associated with Vidal's Bakery does not match Tim's job description, the work item related to the task associated with Vidal's Bakery may not be outputted.

Further analyzing the records according to the third most important factor, the distance of the contact to the user, it is determined that Lily's Bakery is closer to Tim's location than Big Sam's BBQ Restaurant and Shack of Burgers. Accordingly, the work item for servicing the account of Lily's Bakery is given a higher output order than servicing the accounts of Big Sam's BBQ Restaurant and Shack of Burgers. If the records of Big Sam's BBQ Restaurant and Shack of Burgers are further analyzed according to Tim's schedule, it may be determined that since the account of Big Sam's BBQ Restaurant requires less time to service than that of Shack of Burgers, the work item for servicing the account of Big Sam's BBQ Restaurant may receive a higher output order than the work item for servicing the account of Shack of Burgers. Hence, the final output order for the work items is (from highest priority output order to lowest priority): 1) Lily's Bakery, 2) Big Sam's BBQ Restaurant, 3) Shack of Burgers, and 4) Vidal's Bakery. The work item for The Bread Van is not outputted since Tim's schedule would not be able to accommodate the task.

In other implementations, the output order may be calculated through different ways, may take into account different factors, and may vary in the weighting that is assigned to the various factors. For example, other implementations may factor in travel time or the number of tasks or opportunities and/or the dollar value of a contact in determining the output order. Additionally, certain other implementations may, instead of analyzing the factors in a linear relationship by first analyzing the most important factor, then the second most important factor, then the third most important factor, etc., assign weights to the various factors instead. In such an implementation, the distance of the contact or task from Tim, the nature of the task, and the time required to service the task may all be converted into a numerical value. The numerical values of each may then be modified by the weighting factor, and a final output value calculated by summing the numerical values modified by their respective weighting factors. The output order may then be determined by placing the task with the highest overall value first and so on. In certain implementations, the weighting of various factors may vary depending on current conditions. In one example, if a company is experiencing cash flow problems, the weighting given to opportunities that have a high likelihood of being closed may be increased, while opportunities that have a low likelihood of being closed may be given a lower weighting. In another example, if inclement weather conditions are detected at the location of a user, short travel time may be given an increased weighting. However, short travel time may not be given an increased weighting if a mobile device carried by a user detects that the user is traveling via automobile, such as from analyzing the e-mails of the user to determine that the user has a currently booked a rental car.

The output order may also be dynamic and may be changed depending on circumstance. Referring back to the example involving Tim, if time passes and Tim has only 45 minutes of free time until his next meeting, the output order may change to only output the work item associated with Big Sam's BBQ Restaurant as there is no longer sufficient time for Tim to service the other work items. Thus, the output order may be dynamic and the outputs determined to be relevant to the user and the output order may change depending on the situation associated with the user.

Figure 5:
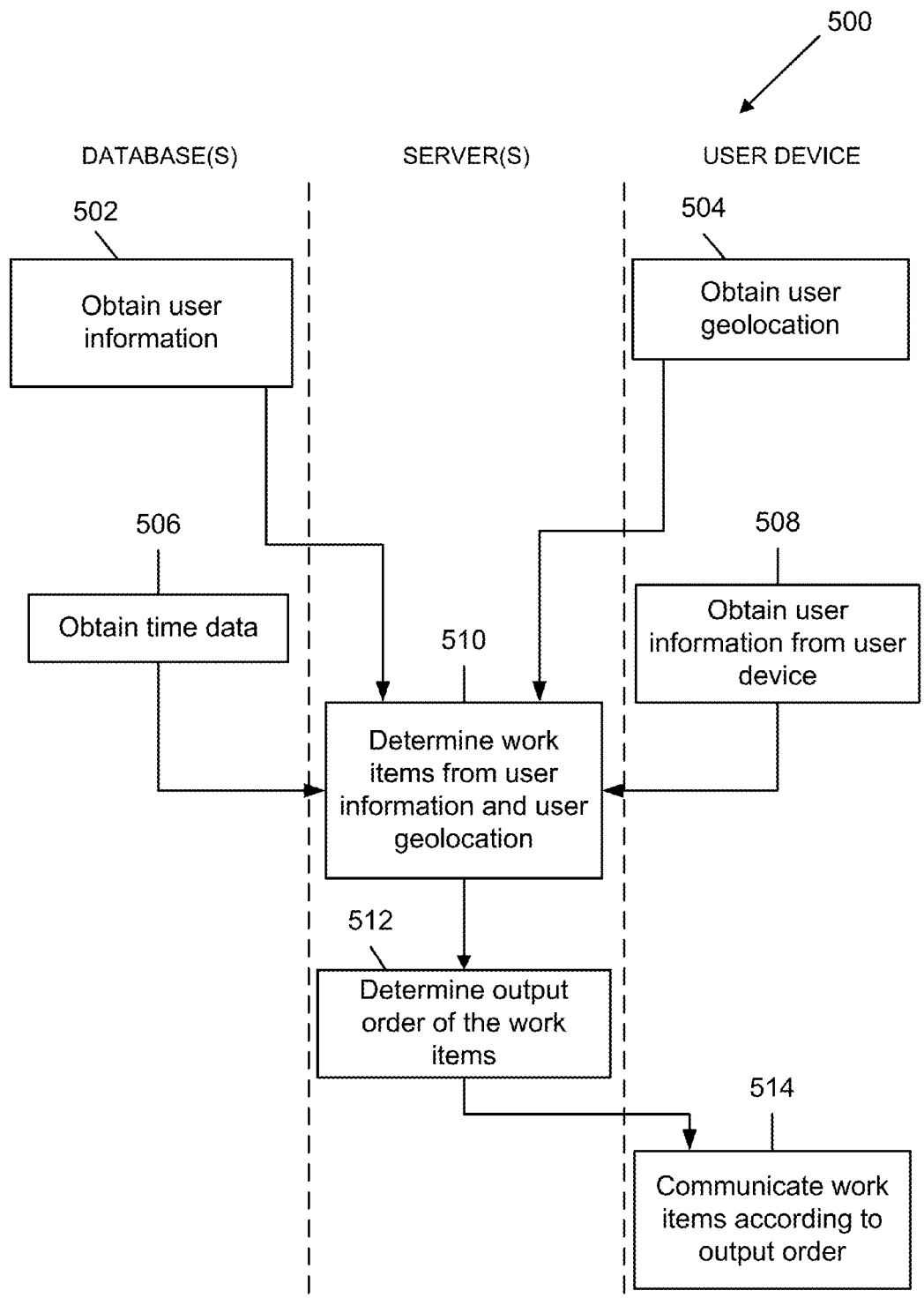
FIG. 5 shows an example of a diagram of operations performed amongst a user device, one or more servers, and a database for providing work items in a certain order based on detected user geolocation, time, and other information, performed in accordance with some implementations.

FIG. 5 shows an example of a diagram of operations performed amongst a user device, one or more servers, and a database for providing work items in a certain order based on detected user geolocation, time, and other information, performed in accordance with some implementations. Blocks 502, 504, 510, 512, and 514 are similar to blocks 402, 404, 406, 408, and 410 in FIG. 4, as described above.

In FIG. 5, time data and user information are also obtained in blocks 506 and 508, respectively. The time data obtained in 506 may be the user's schedule, as in examples previously described, or it may be a time of day, date, or other time related data. The time data may be obtained from, for example, the user device, the cloud, a public network such as a cellular network, or other sources.

In block 508, user information may be obtained from a user device. In various implementations, the user information may include, for example, user schedule information, information on the user's interest, the user's role, itineraries of the user, the transportation options of the user, e-mails and other communications of the user, contact information, as well as other information stored on the user device.

Blocks 510 and 512 determine the work items from the user information, user geolocation, time data, and user information as well as an output order of the work items. The work items and the output order in blocks 510 and 512 may be determined in a manner similar to that detailed in blocks 406 and 408, respectively. However, in blocks 510 and 512, the work items and the output order may be determined while considering the additional time data and user information. For example, the time data may be considered such that, if the time data indicates a time of day or day of the week when a business may be closed, the record associated with the business may be determined to not be a relevant work item that should be outputted. In another example, the e-mails contained on the user device may be analyzed. If any of the e-mails mentions that an account is high priority, such as through the phrase "This action is a high priority," the work item associated with the action may be assigned a higher priority in determining the output order as compared to other work items indicated by e-mails to be low priority.

In an additional example, the time is 5:00 pm and Tiffany has currently finished all scheduled client meetings. Tiffany's smartphone detects that within 1 mile of her lies four potential sales opportunities: Hardware Depot, Woodshop of the Bronx, Tools4Less, and Max Hardware. Tiffany's smartphone automatically scans the message history present on her smartphone for messages relating to the four potential sales opportunities. The scan finds messages between Tiffany and her supervisor that suggest that the opportunities for Woodshop of the Bronx, Tools4Less, and Max Hardware seem promising, but that Hardware Depot is a fairly low priority. The scan also finds a message between Tiffany and her supervisor suggesting problematic personal history between Tiffany and the main contact at Max Hardware. From this scan, it is determined that due to the problematic personal history between Tiffany and the main contact at Max Hardware, the sales opportunity for Max Hardware would not be an appropriate work item to output to Tiffany and that the work item associated with the sales opportunity for Hardware Depot would be a lower priority than the work items associated with the sale opportunities for Woodshop of the Bronx and Tools4Less.

Additionally, Tiffany's smartphone detects that the current time is 5:00 pm and also downloads CRM information associated with the four sales opportunities. From the CRM information, it is determined that Woodshop of the Bronx is currently closed, but the stores of Hardware Depot, Tools4Less, and Max Hardware are open. Since Woodshop of the Bronx is determined to be closed, the sales opportunity for Woodshop of the Bronx is determined to not be an appropriate work item to output. Thus, only two of the sales opportunities are determined to be work items that should be outputted to Tiffany: Tools4Less and Hardware Depot. The work items associated with the sales opportunities of Tools4Less and Hardware Depot are then outputted as cards. Additionally, since the work item associated with Hardware Depot is determined to be a lower priority than the work item associated with Tools4Less, the order that the cards are displayed on Tiffany's smartphone is Tools4Less first and Hardware Depot second.

Figure 6:
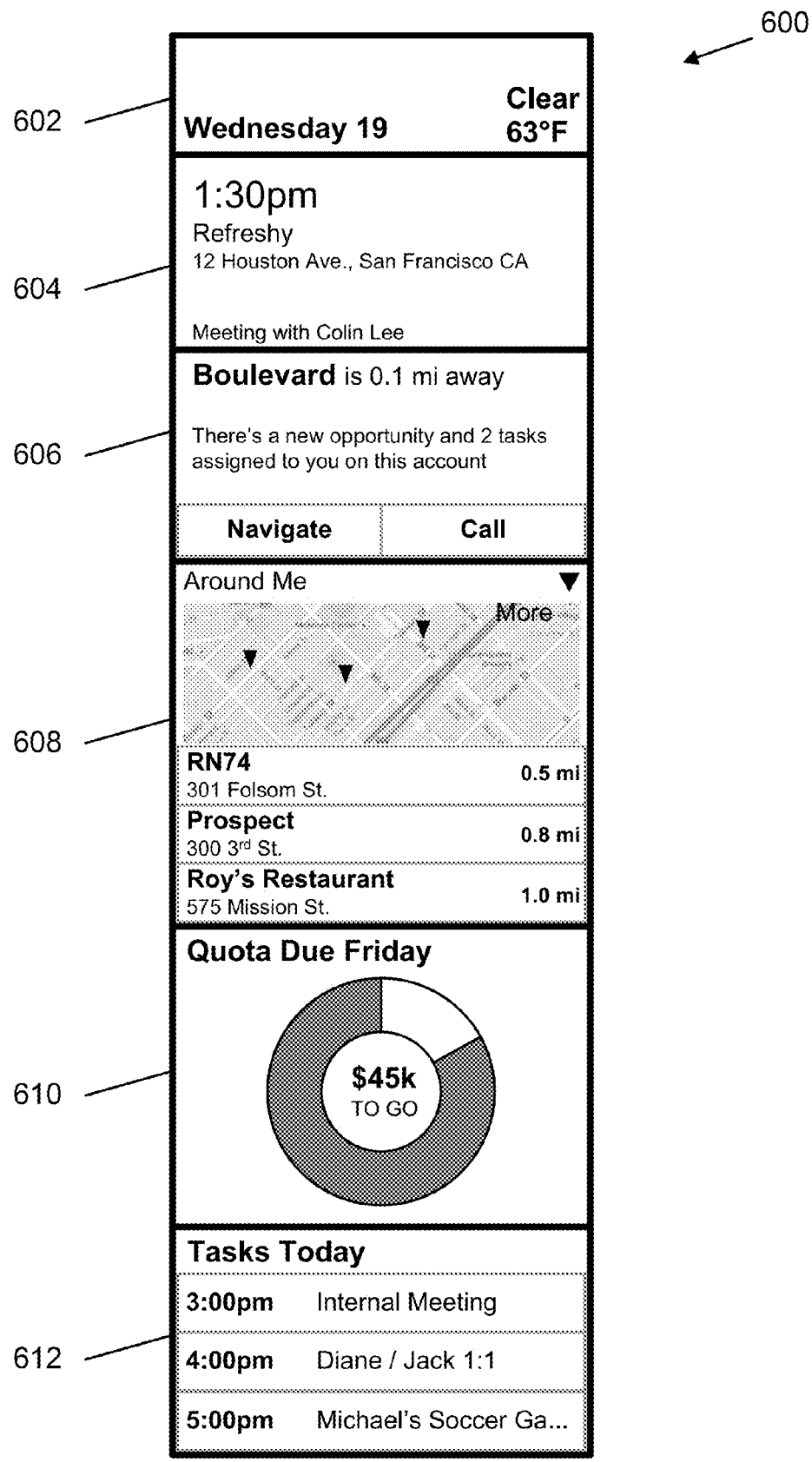
FIG. 6 shows an example of a presentation of work items in the form of a graphical user interface (GUI) as displayed on a computing device, in accordance with some implementations.

FIG. 6 shows an example of a presentation of work items in the form of a graphical user interface (GUI) as displayed on a computing device, in accordance with some implementations. In this example, the presentation is in the form of an information deck 600 including work items in the form of cards 602-12 generated and output using the techniques disclosed herein. The cards 602-12 in information deck 600 are arranged vertically from top-to-bottom according to an output order as described above. Other implementations of the information deck may display cards in different manners, such as via a grid pattern or a scrollable string. The fonts, graphics, and styles of the cards may also be different for other implementations. Those skilled in the art should appreciate that information deck 600 as shown in FIG. 6 illustrates one state of the information deck at a given point in time. The cards outputted and arranged in the information deck may change to define other different states of the same deck.

The cards in information deck 600 may be dynamically updated due to a variety of changing circumstances. As an example, if it is determined that a card suggests a task with a duration that may now be unlikely to be completed in time before a next scheduled meeting, that card may be eliminated from the information deck. Such a situation may be possible where a card is outputted suggesting a task that may be estimated to require an hour to complete, but the time to the next scheduled task of the user is now 59 minutes. In situations where a card is eliminated, a new card may be displayed to take the space of the eliminated card in the information deck.

Card 602 is a card detailing the date and local weather. The card displays the day of the week and date on the left hand side of the card and the weather on the right hand side of the card. In other implementations, the date and local weather may be displayed in other locations. Additionally, the date and/or the weather may not be displayed in certain implementations. In certain implementations, the card 602 may be persistently displayed at the same location in the information deck.

Card 604 is a card displaying the next scheduled task for a user. The scheduled task may be determined by looking at, for example, a calendar of the user's such as an Outlook® calendar, or the task may be determined by analyzing communications and other data associated with the user. As an example, Katie's schedule is stored on a database. Her schedule shows that her next scheduled task is a meeting with Refreshy at 1:30 pm. The meeting with Refreshy is determined to be a relevant work item. Katie's next scheduled task is determined to have the highest priority since missing a meeting would severely damage relationships with a contact. Thus, the card detailing the next scheduled task as positioned at the top of a portion of the information deck that can be dynamically updated. Accordingly, the information deck 600 displays card 604 right below card 602.

Card 606 is a card displaying a nearby contact that has an associated opportunity and tasks associated with the contact. The contact may be determined through any of the ways described herein. For example, Katie's detected location may be used to determine which contacts closest to Katie have possible opportunities and/or open tasks. Furthermore, the number of outstanding tasks associated with a contact may be used to determine which contact to output. Accordingly, a contact with a higher number of outstanding tasks may have a higher likelihood of being outputted as a work item or may have a higher output order. The contact may be displayed as a card, possibly with information on the opportunities and/or tasks. The output may also include details on the opportunity, contact address, contact phone number, contact e-mail, and other contact information as well as options to navigate to, message, call, text, e-mail, or otherwise communicate with the contact. Card 606 shows options to navigate to as well as call the contact. In this respect, the cards of the information deck include information and functionality to help the user accomplish any displayed tasks or suggestions.

Card 608 displays several nearby contacts in a map format. For example, the server may output the three closest contacts to the detected location. In certain implementations, only contacts with outstanding actions to be performed, such as an outstanding task or an opportunity to pursue, may be outputted while other implementations may output contacts regardless of whether there are any outstanding actions. Card 608 also includes a map that plots the locations of the nearby contacts. The map may be created by, for example, plotting the contact addresses on a third-party map service, such as Google Maps or MapQuest, and then embedding the map with the plotted contacts into the card. If a card has multiple contacts plotted, such as card 608, detailed information of the contacts may be omitted in the interest of space.

Card 610 is a graphical representation of a quota of the user with user progress information, which indicates the progress of the user towards meeting the quota as a work item. The duration of the quota may vary depending on the quota information and/or the structure of the organization. The graphics of the progress as displayed on the card may be created from information maintained at the CRM database and/or the user device. The graphics of the progress, as well as the graphics of any other card, may be changed according to settings determined by the user, by the administrator, or by another associated member.

Card 612 displays other scheduled tasks for the day. The other scheduled tasks may be determined through any of the ways detailed herein. In certain implementations, it may be determined that since the other scheduled tasks are not urgent and do not require immediate attention, the output showing the other scheduled tasks may be fairly low priority. Accordingly, the output showing the other scheduled tasks, shown as card 612 in information deck 600, may be displayed towards the bottom of or at the end of the information deck or may not be displayed at all. However, if settings determine that displaying the user's schedule is a high priority, the scheduled tasks may be displayed in a higher position.

In other implementations, cards different from the cards shown in information deck 600, showing other information or the same information in alternative ways, may be displayed to the user. As an example, a card may help a user with the planning of his or her business trip. Such a card may detect the weather of a location that the user is scheduled to travel to and advise the user on appropriate clothing to pack for the trip. An additional card may detect traffic conditions around the user. If it is determined that traffic may affect the travel time of the user to his or her next scheduled meeting, the card may provide a warning to the user. Another implementation may update an existing card, such as the card 602, to provide a warning to the user that an earlier departure time for travel to the next meeting may be desirable if there is detected to be congestion in the travel route. A further implementation may determine the downtime of the current user. If it is determined that a user has plenty of time until the next meeting, it may suggest a route to the next meeting that would take a salesperson through a longer route that may have other possible opportunities, rather than through the most direct route possible. Additionally, a card may also suggest tasks to the user in the event of detected downtime, such as a card to suggest checking e-mail, a card to suggest finishing a report, or cards reminding the user to perform other outstanding tasks. Cards may also have a longer time horizon than just a day. Information decks detailing a user's schedule for tomorrow, for the next week, for the next month, etc. may also be possible. Furthermore, the output order of the cards may also be determined through ways different from how the output order of the cards in information deck 600 was determined. These and other examples of possible cards described herein are intended to be non-limiting examples.

Cards may be interactive. For example, a user may click on a card for further information on the information displayed in the card. Thus, a user may click or interact with card 604 to click through to the Refreshy website to obtain further information on Refreshy and/or obtain the agenda of the meeting with Refreshy. Accordingly, an agenda for the meeting may be displayed when the user clicks on card 604. Furthermore, a user may interact with a card to dismiss the card if a user does not find the information contained within a card to be useful. Another card may be outputted to take the place of a dismissed card. Additionally, a user may also be able to share a card. Going back to the example of card 606, Katie may determine that she does not have the bandwidth to pursue the opportunity displayed in card 606, but may believe that her colleague LeAnne may be interested in pursuing the opportunity. Thus, Katie may share card 606 with LeAnne. Card 606 may be shared with LeAnne through Katie's selection of the card and subsequent delivery of the card to LeAnne via e-mail, by outputting the card to LeAnne's information deck, through posting the card to a social media network such as a feed on Chatter®, by sending the information of the contact and opportunity via a text message, or through other methods.

The information deck may be configured to have certain logic in the order. For example, an information deck may be organized such that immediate tasks are displayed at or near the top, that the tasks for the day are displayed after immediate tasks, that opportunities or tasks not schedule are displayed after immediate tasks, and that reference information is displayed at the bottom. Other implementations of the information deck may be organized differently and hence cards may be displayed in different orders.

Figure 7:
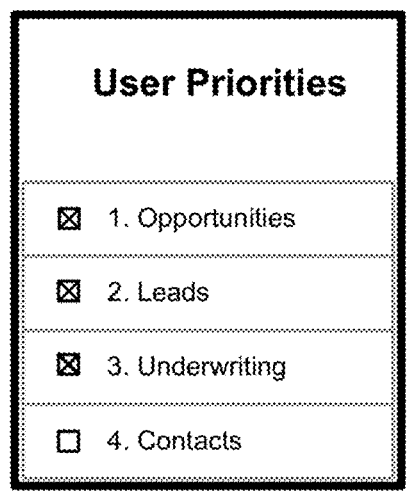
FIG. 7 shows an example of a presentation of user priority selections as displayed on a computing device, in accordance with some implementations.

FIG. 7 shows an example of a presentation of user priority selections as displayed on a computing device, in accordance with some implementations. The user priority selection interface in FIG. 7 may be used to help determine an output order for the work items or cards of an information deck. In certain implementations, the user priority may be manually selected by a user, an administrator, a supervisor, or another member associated with a business. In FIG. 7, four different checkboxes are shown: opportunities, leads, underwriting, and contacts. Opportunities, leads, and underwriting are selected while contacts is not selected. Accordingly, information related to records in the form of opportunities, leads, and underwriting may be determined to be relevant work items while information related to contacts may be determined to not be relevant work items. In some implementations, relevant work items may be outputted to the user, while work items that are not relevant may not be outputted to the user. In certain implementations, if information identifies both opportunities and contacts, it may be determined to still be a relevant work item due to the association with opportunities. Other implementations may allow a user to designate a priority order rather than simply check off priorities. In such implementations, the priority order may also be utilized in determining which records should be outputted or may be utilized in determining an output order. Additionally, the priorities that may be selected may be a standard set of priorities, or they may be custom priorities. For example, checkbox number 3, underwriting, may be a custom priority that may be set by companies that have underwriting services, such as insurance companies. Underwriting may be a priority that is absent from other companies that do not have underwriting services, such as wholesale businesses.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multitenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a screen, a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system comprising one or more processors, the database system configurable to cause:
   obtaining first data from a mobile device associated with a user affiliated with an organization, the first data comprising:
   first geolocation data identifying a first geographic location of the mobile device, and one or more electronic communications;
   identifying, in a database storing a plurality of customer data records related to a plurality of customers of the organization, a subset of the customer data records as:
   being associated with the user, and
   having associated contact information identifying an address within a designated range of the first geographic location;
   generating a plurality of work items corresponding to the subset of customer data records, each work item comprising work data capable of being acted upon by the user to perform work related to servicing a customer;
   identifying, using at least the one or more electronic communications, a subset of the work items and a priority of the work items in the subset;
   sending second data to the mobile device, the second data comprising or indicating the subset of work items and the priority, the second data configured to be processed to cause display on the mobile device of an arrangement of the work items in the subset according to the priority;
   obtaining third data from the mobile device, the third data comprising second geolocation data identifying a second geographic location of the mobile device, the second geographic location being different from the first geographic location;
   determining a first numerical value representing the second geographical location;
   identifying, using the database, a plurality of factors associated with the subset of customer data records;
   determining a plurality of second numerical values, each second numerical value representing a respective one of the factors;
   obtaining a plurality of weighted numerical values generated by applying a respective one of a plurality of numerical weights to a respective one of a set of numerical values comprising the first numerical value and comprising the second numerical values;
   changing the priority of the work items in the subset based at least in part on the weighted numerical values;
   sending fourth data to the mobile device, the fourth data comprising or indicating the changed priority, the fourth data configured to be processed to cause updating the display of the arrangement of the work items in the subset according to the changed priority; and
   updating, responsive to obtaining fifth data from the mobile device, one or more of the subset of customer data records to indicate performance of work associated with one or more of the work items in the displayed arrangement.

2. The system of claim 1, wherein identifying the subset of customer data records as being associated with the user comprises identifying the subset of customer data records as having one or more user actions to be performed by the user, the work data identifying the subset of customer data records and identifying the one or more user actions.

3. The system of claim 2, wherein identifying the subset of customer data records as having the one or more user actions comprises identifying one or more of: a user action assigned to the user within a designated time range, or a count of user actions assigned to the user and meeting or exceeding a threshold.

4. The system of claim 1, wherein the first data further comprises mobile device record data identifying one or more device records stored at the mobile device, the one or more device records being associated with:
   the user;
   one or more of: a task, a message, a social networking conversation, an e-mail, a travel itinerary, or a contact; and
   the subset of customer data records.

5. The system of claim 1, wherein identifying the subset of customer data records as having the associated contact information comprises:
   identifying an upcoming calendar event of the user;
   identifying a person or an organization associated with the calendar event; and
   identifying a contact having the contact information as being the person or the organization.

6. The system of claim 5, wherein identifying the subset of customer data records as having the associated contact information further comprises:
   identifying an account having a parent-child relationship with the contact in a hierarchical data model; and
   identifying one or more of a lead or an opportunity having a child-parent relationship with the account in the hierarchical data model, the work data identifying one or more of: the account, the lead, or the opportunity.

7. The system of claim 1, wherein:
identifying the subset of customer data records as being associated with the user comprises identifying an account associated with the user; and
identifying the subset of customer data records as having the associated contact information comprises identifying a contact having a child-parent relationship with the account in a hierarchical data model.

8. The system of claim 1, the database system further configurable to cause:
identifying a time associated with the first data;
accessing calendar data indicating calendar events of the user; and
determining that the time is outside of time ranges of the calendar events.

9. The system of claim 1, the database system further configurable to cause:
determining the priority of the work items in the subset according to one or more of: the first geographic location, a deadline of an action to be performed, a status of an action to be performed, an importance of an action to be performed, a geographic proximity of the contact information, an amount of work performed within a time threshold, a relationship of the user to a contact, or a time associated with the first data.

10. The system of claim 1, the database system further configurable to cause determining that a schedule of the user has an opening of a duration, wherein:
identifying the subset of customer data records comprises identifying the subset of customer data records as having one or more user actions to be performed by the user in a time less than the duration, the work data identifying the one or more user actions.

11. The system of claim 1, wherein identifying the subset of customer data records comprises one or more of: identifying the subset of customer data records as having an "urgent" status, identifying the subset of customer data records as having been accessed by the user within a timeframe, identifying one or more user actions as having been worked on within a timeframe, identifying the subset of customer data records as meeting a user-specified criterion, or identifying one or more user actions as not having been worked on within a timeframe and having an action completion status above a completion threshold.

12. The system of claim 1, wherein the second data comprises one or more of: a route for travel from the first geographic location to the address, or a travel time from the first geographic location to the address.

13. The system of claim 1, the database system further configurable to cause:
identifying a sales quota associated with the user; and
determining a user sales quota progress, the second data further comprising or indicating the user sales quota progress.

14. The system of claim 1, wherein the customer data records stored in the database system identify one or more of: an e-mail, an address book, a social networking communication, a message, a calendar event, a task, a travel itinerary, or a quota.

15. The system of claim 1, wherein the customer data records stored in the database system are Customer Relationship Management (CRM) records comprising one or more of: an account, a lead, an opportunity, a case, or a contact.

16. A database-implemented method performed using a computing system comprising one or more processors, the method comprising:
obtaining first data from a mobile device associated with a user affiliated with an organization, the first data comprising:
first geolocation data identifying a first geographic location of the mobile device, and one or more electronic communications;
identifying, in a database storing a plurality of customer data records related to a plurality of customers of the organization, a subset of the customer data records as:
being associated with the user, and
having associated contact information identifying an address within a designated range of the first geographic location;
generating a plurality of work items corresponding to the subset of customer data records, each work item comprising work data capable of being acted upon by the user to perform work related to servicing a customer;
identifying, using at least the one or more electronic communications, a subset of the work items and a priority of the work items in the subset;
sending second data to the mobile device, the second data comprising or indicating the subset of work items and the priority, the second data configured to be processed to cause display on the mobile device of an arrangement of the work items in the subset according to the priority;
obtaining third data from the mobile device, the third data comprising second geolocation data identifying a second geographic location of the mobile device, the second geographic location being different from the first geographic location;
determining a first numerical value representing the second geographical location;
identifying, using the database, a plurality of factors associated with the subset of customer data records;
determining a plurality of second numerical values, each second numerical value representing a respective one of the factors;
obtaining a plurality of weighted numerical values generated by applying a respective one of a plurality of numerical weights to a respective one of a set of numerical values comprising the first numerical value and comprising the second numerical values;
changing the priority of the work items in the subset based at least in part on the weighted numerical values;
sending fourth data to the mobile device, the fourth data comprising or indicating the changed priority, the fourth data configured to be processed to cause updating the display of the arrangement of the work items in the subset according to the changed priority; and
updating, responsive to obtaining fifth data from the mobile device, one or more of the subset of customer data records to indicate performance of work associated with one or more of the work items in the displayed arrangement.

17. The method of claim 16, further comprising:
determining the priority of the work items in the subset according to one or more of: the first geographic location, a deadline of an action to be performed, a status of an action to be performed, an importance of an action to be performed, a geographic proximity of the contact information, an amount of work performed within a time threshold, a relationship of the user to a contact, or a time associated with the first data.

18. The method of claim 16, wherein identifying the subset of customer data records comprises one or more of: identifying the subset of customer data records as having an "urgent" status, identifying the subset of customer data records as having been accessed by the user within a timeframe, identifying one or more user actions as having been worked on within a timeframe, identifying the subset of customer data records as meeting a user-specified criterion, or identifying one or more user actions as not having been worked on within a timeframe and having an action completion status above a completion threshold.

19. A computer program product comprising computer-readable program code to be executed by one or more processors when retrieved from a non-transitory computer-readable medium, the program code comprising instructions configured to cause:
   obtaining first data from a mobile device associated with a user affiliated with an organization, the first data comprising:
      first geolocation data identifying a first geographic location of the mobile device, and one or more electronic communications;
   identifying, in a database storing a plurality of customer data records related to a plurality of customers of the organization, a subset of the customer data records as:
      being associated with the user, and
      having associated contact information identifying an address within a designated range of the first geographic location;
   generating a plurality of work items corresponding to the subset of customer data records, each work item comprising work data capable of being acted upon by the user to perform work related to servicing a customer;
   identifying, using at least the one or more electronic communications, a subset of the work items and a priority of the work items in the subset;
   sending second data to the mobile device, the second data comprising or indicating the subset of work items and the priority, the second data configured to be processed to cause display on the mobile device of an arrangement of the work items in the subset according to the priority;
   obtaining third data from the mobile device, the third data comprising second geolocation data identifying a second geographic location of the mobile device, the second geographic location being different from the first geographic location;
   determining a first numerical value representing the second geographical location;
   identifying, using the database, a plurality of factors associated with the subset of customer data records;
   determining a plurality of second numerical values, each second numerical value representing a respective one of the factors;
   obtaining a plurality of weighted numerical values generated by applying a respective one of a plurality of numerical weights to a respective one of a set of numerical values comprising the first numerical value and comprising the second numerical values;
   changing the priority of the work items in the subset based at least in part on the weighted numerical values;
   sending fourth data to the mobile device, the fourth data comprising or indicating the changed priority, the fourth data configured to be processed to cause updating the display of the arrangement of the work items in the subset according to the changed priority; and
   updating, responsive to obtaining fifth data from the mobile device, one or more of the subset of customer data records to indicate performance of work associated with one or more of the work items in the displayed arrangement.

20. The computer program product of claim 19, the instructions further configured to cause:
   determining the priority of the work items in the subset according to one or more of: the first geographic location, a deadline of an action to be performed, a status of an action to be performed, an importance of an action to be performed, a geographic proximity of the contact information, an amount of work performed within a time threshold, a relationship of the user to a contact, or a time associated with the first data.

21. The computer program product of claim 19, wherein identifying the subset of customer data records comprises one or more of: identifying the subset of customer data records as having an "urgent" status, identifying the subset of customer data records as having been accessed by the user within a timeframe, identifying one or more user actions as having been worked on within a timeframe, identifying the subset of customer data records as meeting a user-specified criterion, or identifying one or more user actions as not having been worked on within a timeframe and having an action completion status above a completion threshold.

* * * * *